US011969989B2

(12) United States Patent
Karakatsanis et al.

(10) Patent No.: US 11,969,989 B2
(45) Date of Patent: Apr. 30, 2024

(54) PRINTING MACHINE AND METHOD OF OPERATING A PRINTING MACHINE

(71) Applicant: BOBST BIELEFELD GMBH, Bielefeld (DE)

(72) Inventors: Michael Karakatsanis, Dallgow-Döberitz (DE); Andreas Garbsch, Bad Salzuflen (DE); Viktor Hildebrand, Leopoldshöhe (DE)

(73) Assignee: BOBST BIELEFELD GMBH, Bielefeld (DE)

( * ) Notice: Subject to any disclaimer, the term of this patent is extended or adjusted under 35 U.S.C. 154(b) by 0 days.

(21) Appl. No.: 17/759,312

(22) PCT Filed: Jan. 20, 2021

(86) PCT No.: PCT/EP2021/051154
§ 371 (c)(1),
(2) Date: Jul. 22, 2022

(87) PCT Pub. No.: WO2021/151751
PCT Pub. Date: Aug. 5, 2021

(65) Prior Publication Data

US 2023/0066701 A1 Mar. 2, 2023

(30) Foreign Application Priority Data

Jan. 30, 2020 (EP) .................................... 20020050

(51) Int. Cl.
*B41F 31/02* (2006.01)
*B41F 31/04* (2006.01)
*B41F 35/00* (2006.01)

(52) U.S. Cl.
CPC .............. *B41F 31/02* (2013.01); *B41F 31/04* (2013.01); *B41F 35/008* (2013.01)

(58) Field of Classification Search
None
See application file for complete search history.

(56) References Cited

U.S. PATENT DOCUMENTS 3,783,781 A * 1/1974 Grommek ............ B41F 9/1036 101/169
5,226,363 A 7/1993 Weishew
(Continued)

FOREIGN PATENT DOCUMENTS

CN 101045366 A 10/2007
CN 105408116 A 3/2016
(Continued)

OTHER PUBLICATIONS

English language translation of DE 10 2012 201 378 A1 to Reder et al., publication date Aug. 14, 2013. (Year: 2013).*
(Continued)

*Primary Examiner* — Leslie J Evanisko
(74) *Attorney, Agent, or Firm* — Bookoff McAndrews, PLLC

(57) ABSTRACT

A printing machine (10) comprises a doctor blade (14), a drive system (20) for urging the doctor blade (14) against a printing cylinder (16) of the printing machine (10), a sensor (32) adapted for sensing a force with which the doctor blade (14) is urged against the printing cylinder (16), and a mechanical locking element (34) adapted for locking the drive system (20) in its operating position.
Further, a method of operating a printing machine (10) is presented.

20 Claims, 3 Drawing Sheets

(56) References Cited

U.S. PATENT DOCUMENTS

| | | | | |
|---|---|---|---|---|
| 2002/0023587 | A1* | 2/2002 | Burgard ................. | D21H 23/56 118/683 |
| 2008/0295718 | A1 | 12/2008 | Kleinschnitz et al. | |
| 2009/0151579 | A1* | 6/2009 | Sumiyoshi ............ | B41F 9/1045 101/169 |
| 2017/0341366 | A1 | 11/2017 | Sakata | |
| 2018/0170032 | A1 | 6/2018 | Schumann et al. | |

FOREIGN PATENT DOCUMENTS

| | | | |
|---|---|---|---|
| CN | 108025547 | A | 5/2018 |
| CN | 109153254 | A | 1/2019 |
| CN | 109203672 | A | 1/2019 |
| CN | 107160833 | B | 2/2019 |
| CN | 110171198 | A | 8/2019 |
| DE | 102007018133 | A1 | 10/2008 |
| DE | 102012201378 | A1 | 8/2013 |
| DE | 102020109844 | A1 * | 10/2021 |
| JP | 2005096352 | A | 4/2005 |
| TW | 201730016 | A | 9/2017 |
| TW | 201802294 | A | 1/2018 |
| WO | 2017198296 | A1 | 11/2017 |

OTHER PUBLICATIONS

English language translation of DE 10 2007 018 133 A1 from EPO website, publication date Oct. 2008. (Year: 2008).*

European Patent Office, International Search Report, PCT/EP2021/051154, Feb. 12, 2021, 4 pages, Europe.

* cited by examiner

PRINTING MACHINE AND METHOD OF OPERATING A PRINTING MACHINE

CROSS-REFERENCE TO RELATED APPLICATION(S)

This patent application is a National Stage Application under of 35 U.S.C. § 371 of International Patent Application No. PCT/EP2021/051154, filed on Jan. 20, 2021, which claims priority to European Application No. 20020050.9, filed on Jan. 30, 2020, the entireties of which are incorporated herein by reference.

TECHNICAL FIELD OF THE INVENTION

The invention relates to a printing machine, especially a flexographic printing press, and a method of operating such a printing machine.

BACKGROUND OF THE INVENTION

In printing machines, inks are applied on a printing cylinder from which the ink is applied in a subsequent step to a substrate. Typically, several printing cylinders are used, wherein the ink is first transferred from an ink reservoir to a first printing cylinder/anilox roll from which the ink is further transferred to the actual printing cylinder that is in contact with the substrate.

Flexographic printing units use so-called anilox rolls as printing cylinders for taking up the ink. Anilox rolls have engravings on their surface in which the ink is collected. Doctor blades are used to scrape off excess ink from the surface of the anilox roll.

The ink reservoir can also be formed by a so-called chamber doctor blade system which creates the ink reservoir within a cavity formed between the backside of the chamber doctor blade and the anilox roll. The ink reservoir is limited in the direction of rotation of the anilox roll by two blades being in contact with the anilox roll.

To prevent ink leakage from the ink reservoir the chamber doctor blade, especially the blades of the chamber doctor blade, must be pressed against the anilox roll with sufficient force. However, as the anilox roll is constantly turning, the blades of the chamber doctor blade wear down over time during operation of the printing machine due to friction between the blades and the rotating anilox roll. Therefore, ink leakage and/or ink splashes can occur, as the chamber doctor blade might not sufficiently press against the anilox roll anymore and the blades have to be changed quite often During operation of the printing machine, the viscosity of the ink supplied into the ink reservoir can change. Such viscosity changes can result in pressure changes within the ink reservoir and can lead to the chamber doctor blade being pushed away from the anilox roll, resulting in ink leakage.

The object of the invention is to provide a printing machine that allows to prevent ink leakage from the chamber doctor blade system and to provide a method for operating such a printing machine.

SUMMARY OF THE INVENTION

The object of the invention is solved by a printing machine comprising a doctor blade, a drive system for urging the doctor blade against a substantially static printing cylinder/anilox roll of the printing machine, a sensor adapted for sensing a force with which the doctor blade is urged against the printing cylinder/anilox roll, and a mechanical locking element adapted for locking the drive system in its operating position.

When mentioning that the printing cylinder of the printing machine is substantially static, it is meant that the printing cylinder for sure is moving in a radial direction, but not substantially in a radial direction.

The doctor blade is especially a chamber doctor blade and the printing machine is especially a flexographic printing machine. The printing cylinder might be an anilox roll.

The drive system allows for applying sufficient force on the doctor blade to ensure a tight and constant contact between the doctor blade and the printing cylinder, so that ink leakage can be prevented.

The force measured by the sensor can be translated into a pressure value based on the contact surface between the drive system and the doctor blade and between the doctor blade and the anilox roll, respectively.

Additionally, the operation of the printing machine can be adjusted based on the values obtained by the sensor.

The mechanical locking element ensures a secure position of the drive system during operation of the printing machine and therefore of the position of the doctor blade, too. Accordingly, a movement of the doctor blade away from the printing cylinder/anilox roll as a consequence for example of ink viscosity changes is prevented, as the drive system which holds the doctor blade in place is still locked by the locking mechanism.

In one embodiment, the drive system comprises a piston for applying force on the doctor blade.

The piston can be driven electrically, pneumatically and/or hydraulically. The drive system can especially be a double-acting pneumatic cylinder.

Such a drive system allows for a precise control of the movement of the drive system and therefore of the force applied on the doctor blade. Further, pistons of the drive system can be easily locked in their position by the locking element, ensuring a good control of the force with which the doctor blade is urged against the printing cylinder/anilox roll.

The sensor can be arranged between the lock element and the doctor blade. However, the sensor can also be arranged at any position within the printing machine which ensures a reliable measurement of the force with which the doctor blade is urged against the anilox roller and will depend on the specific arrangement of the chamber doctor blade relative to the drive system.

The sensor can also measure the force even if the drive system is locked by the mechanical locking element, ensuring that in every operation state of the printing machine force values are obtainable by the sensor.

The force which can be measured by a sensor in newton has a resolution in the range of from 10 to 20 N, preferably of 10 N. Such force sensors are cheap and commercially available.

The printing machine can comprise a control unit, which is connected to the drive system, the lock element and/or the sensor, preferably by means of a programmable logic controller (PLC).

The control unit can be adapted to operate the drive system and for defining a target force with which the doctor blade is urged against the substantially in lateral direction static printing cylinder.

Additionally, the control unit can function as a human machine interface (HMI) and might be used to display warnings and information about the current state of the printing machine to an operator of the printing machine.

With this for example the operator can be alerted that a change occurred (e.g. the wrong viscosity of the ink).

The control unit can also have a storage module for storing sensor values received from the sensor. This allows for evaluation of the operation of the printing machine over a longer period.

This allows the cylinder to be mechanically locked at most of the time. Therefore, if changes occur suddenly, constant contact force towards the anilox roller can be maintained. Nevertheless, the system is able to react on any permanent changes like ink viscosity or ink flow.

In order to prevent uncontrolled ink leakage during the inking start up, the system is also able to automatically detect a wrong chamber doctor blade set up.

In one embodiment, the control unit further comprises an analysis module configured to analyze changes in the sensor values in dependency of time and/or frequency. In this case, preferably sensor values over a longer period are available from the storage module.

The analysis module allows for determining various process changes, like ink viscosity or ink flow, resulting in a changing force as measured by the sensor.

The data obtained by the analysis module can be displayed on the HMI so that an operator can easily see if any actions are necessary for correct operation of the printing machine, especially to prevent ink leakage and for a maximum doctor blade lifetime cycle The object of the invention is further solved by a method of operating a printing machine, wherein the printing machine comprises a doctor blade, a drive system for urging the doctor blade against a printing cylinder/anilox roll of the printing machine, a sensor adapted for sensing a force with which the doctor blade is urged against the printing cylinder/anilox roll, a mechanical locking element adapted for locking the drive system in its operating position, and a control unit, wherein the method comprises the following steps:

a) Setting a target force for urging the doctor blade against the printing cylinder/anilox roll,[KM1]
b) Moving the drive system in the operating position, wherein in the operating position the force as measured by the sensor is the target force,
c) Locking the position of the drive system by the mechanical locking element,
d) Measuring an actual force by the sensor and comparing the actual force with the target force, and
e) Unlocking the position of the drive system and repeating steps b) and c) if the actual force is not equal to the target force, wherein step d) is repeated at least once after a set time interval.

The printing machine can be a printing machine as described before.

The method according to the invention allows to automatically adjust the position of the drive system, i.e. the method allows the printing machine to be operated in such a way that the pressure with which the doctor blade is urged against the printing cylinder/anilox roll[KM2] can be readjusted if necessary. At the same time, the drive system can be mechanically locked for ensuring a reliable application of force on the doctor blade and to prevent the doctor blade from being pushed away from the printing cylinder/anilox roll[KM3].

The sensor is monitoring the force/pressure towards the anilox roller, as soon the sensor is automatically detecting any permanent changes, automatically consider time, and frequency of the changes and repulsive force, which is an indicator of the viscosity or ink flow, it will unlock the locking element (e.g., including a pneumatic cylinder) and will change the pressure e.g. on the cylinder via, for example electric/pneumatic transformer until the sensor is reaching back the new set point, before the cylinder will be locked again.

The target force can also be a target force range in which safe operation of the printing machine can be ensured. This allows for some flexibility in the operation of the printing machine, preventing unnecessary repetitions of unlocking and again locking the drive system when only minor force changes occur.

The set time interval after which step d) is repeated can also be so short that an essentially real-time measurement of the force is done. This allows for especially precise control of the printing machine and further reduces the risk of ink leakages.

The control unit can be an human machine interface (HMI) for interaction of an operator with the printing machine.

The target force can be set via the control unit, especially if the control unit is an HMI. The target force can be read from a memory of the control unit or can be set by the operator of the printing machine.

A warning can be given by the control unit of the printing machine when the actual force measured in step d) is not equal to the target force.

If the target force cannot be reached after the drive system is locked by the locking element, it is probable that there is a problem with the set-up of the printing machine. For example no or a wrong doctor blade might have been installed and/or the doctor blade has not correctly reached the surface of the anilox roll. Such cases can be reliably detected with the method according to the invention.

Due to the warning, the operator of the printing machine can become aware that there might be a problem of the printing machine and can fix the set-up before an ink leakage occurs.

In a further embodiment, the values of the actual force measured in step d) are stored, especially stored in the storage module of the control unit, and changes of the values of the actual force are analyzed in dependence of time and/or frequency in the analyzing module of the control unit.

Typical problems during operation of the printing machine can manifest in a known change of sensor values over time and/or frequency. Blade wear can be decreased by keeping the lowest needed force against the anilox roll. Changes can also be compared by the control unit with information from other parts of the printing machine, e.g. by receiving information from a mixing unit which prepares the ink supplied to the ink reservoir. This allows identifying causes of behavior and performance of the printing machine based on interrelated effects from different parts of the printing machine.

Step e) can also be skipped if the observed time and/or frequency change is within a preset range. This allows to precisely define tolerances in the force values which are known to still give reliable printing conditions while preventing unnecessary readjustments of the drive system, thereby increasing the lifetime and performance of the printing machine.

The actual force values can also be monitored and documented for analysis of the operation of the printing machine. This allows for finding optimized parameters for the respective printing machine.

Additionally, the method according to the invention allows less qualified personnel to operate the printing machine, as errors in the setup can easily be detected and corrected.

In a further embodiment, a warning is given by the control unit when the target force cannot be reached in step b). In such a case, it is probable that no or a false doctor blade has been installed and/or a mechanical collision of the movable parts of the drive system has occurred. Due to the warning, these cases can be easily identified by the operator.

Further, before step a), a calibration can be done in which the drive system is moved in a calibration position, wherein in the calibration position a maximum force is measured by the sensor.

The calibration position is equal to the end position of the drive system. The additional calibration step therefore ensures that the full range of positions of the drive system is actually available.

If the end position is not reachable, a warning can be given, especially by the control unit, as in such a case it is likely that the printing machine is damaged or has not been set up properly.

In this embodiment, the force is reduced during step b), as the force is set from the maximum force to the target force. Therefore, it is possible to check this transition of the drive system, too, and display a warning if this movement is not possible.

In yet another embodiment, the force is measured between step b) and step c) by the sensor for a second pre-set time and step c) is done only if the force is constant during the second pre-set time. Otherwise, a warning is given, preferably by the control unit.

Measuring the force between step b) and c) allows to check whether the force with which the doctor blade is urged against the anilox roller can be kept constant by the drive system itself. If this is not the case, an error of the drive system is likely and can be identified easily by the method according to the invention.

BRIEF DESCRIPTION OF THE DRAWINGS

Further advantages and features will become apparent from the following description of the invention and from the appended figures which show a non-limiting exemplary embodiment of the invention and in which.

DETAILED DESCRIPTION OF PREFERRED EMBODIMENTS

Figure 1:
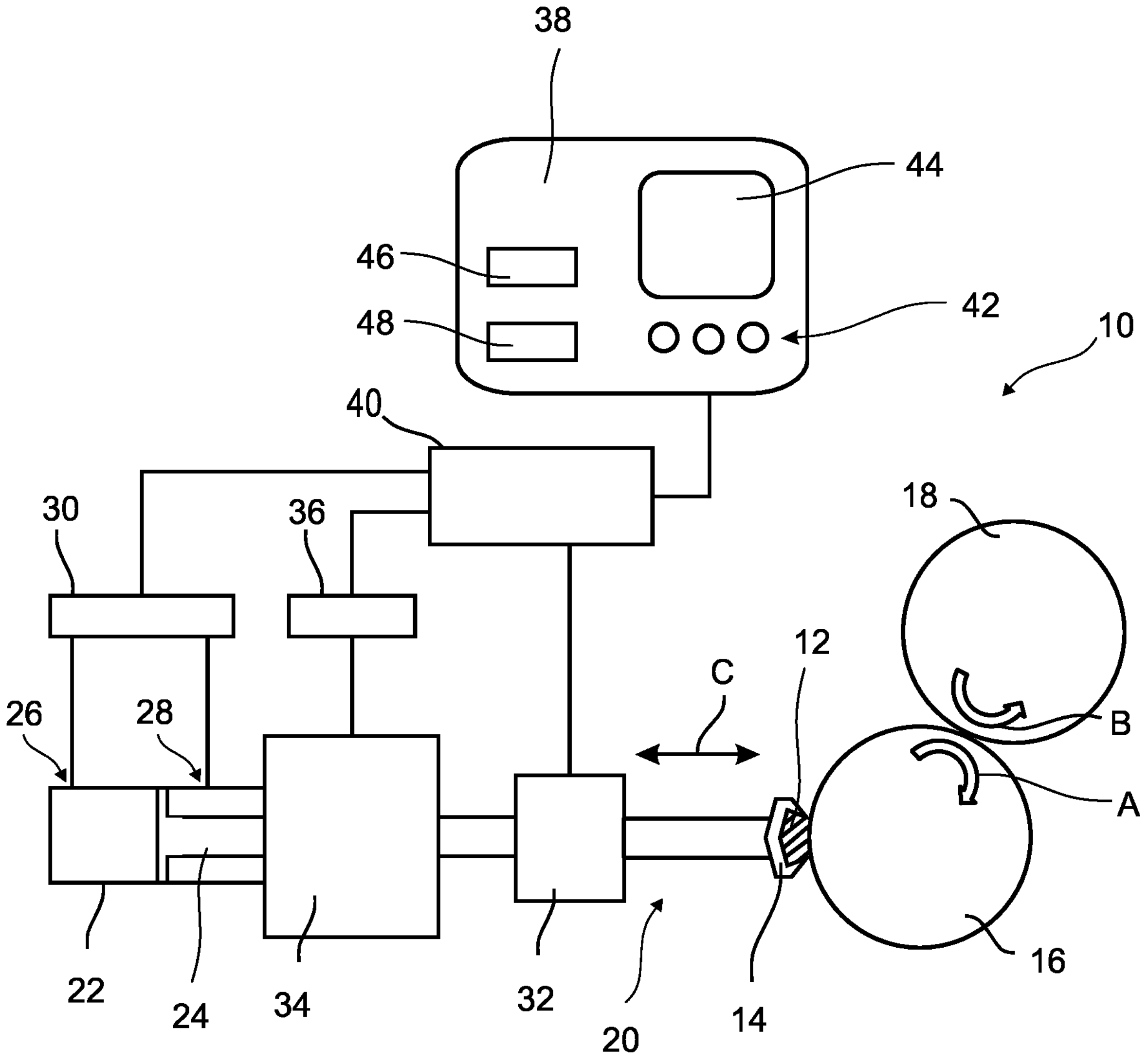
FIG. 1 shows a schematic representation of a printing machine according to a preferred embodiment of the invention.

In FIG. 1, a schematic representation of a printing machine 10 according to the invention is shown.

The printing machine 10 has an ink reservoir 12 formed between a chamber doctor blade 14 and a printing cylinder 16, which is an anilox roll. Accordingly, the printing machine 10 is a flexographic printing unit.

The anilox roll rotates in the direction illustrated in FIG. 1 by the arrow A and takes up ink from the ink reservoir 12 into cells engraved in the surface of the anilox roll during its rotation.

The chamber doctor blade 14 scrapes of excess ink from the surface of the anilox roll.

The ink from the anilox roll is then transferred to other printing cylinders of the printing machine 10, of which only a plate cylinder 18 is shown in part in FIG. 1. Accordingly, the further parts of the printing machine 10 for the actual printing on a substrate are not shown in FIG. 1 and are known in the art.

The plate cylinder 18 is counter-rotating compared to the anilox roll, as illustrated by the arrow B in FIG. 1.

The ink is supplied by a (not shown) ink supply into the chamber doctor blade 14 and therefore into the ink reservoir 12.

The chamber doctor blade 14 is urged against the anilox roll by a drive system 20. The drive system 20 can be moved along the directions illustrated by the double-arrow C shown in FIG. 1.

The drive system 20 comprises a double-acting pneumatic cylinder 22 which can move a piston 24 by supplying air through a first inlet 26 or a second inlet 28. The double-acting pneumatic cylinder 22 is controlled by a pneumatic/electric/pneumoelectric converter 30.

The drive system 20 could also use a single-acting pneumatic cylinder. Alternatively, the drive system 20 can use hydraulically or electrically driven pistons and/or cylinders.

The actual force F with which the drive system 20 urges the chamber doctor blade 14 against the anilox roll can be measured by a sensor 32.

The sensor 32 can measure actual forces and has a digitization/resolution in the range of from 10 to 20 N, preferably of 10 N.

The sensor 32 can be of any form which allows measuring the desired force. As an example, the sensor 32 can be a compression force transducer, a tension/compression force transducer, a column force sensor, a ring force sensor, a strain gauge, a bending beam, a shear beam, a load cell, a load pin and/or a tension link.

The measured actual force F can also be converted into a pressure with which the chamber doctor blade 14 is pressed against the anilox roll.

In the shown embodiment, the sensor 32 is arranged between the pneumatic cylinder 22 and the chamber doctor blade 14.

However, the type of sensor 32 used and the arrangement of the sensor 32 relative to the chamber doctor blade 14 and to the drive system 20 can be different from the shown embodiment, as long as a reliable measurement of the actual force F is ensured.

Further, the printing machine 10 comprises a mechanical locking element 34 which is adapted for locking the piston 24 and therefore the drive system 20 in place.

The mechanical locking element 34 is controlled by a locking control unit 36, which can also be a second pneumoelectric converter.

The mechanical locking element 34 is able to ensure a secure lock of the drive system 20 even when much higher forces than $F_{max}$ are acting on the drive system 20. In the shown embodiment, the locking element 34 ensures a reliable lock of the drive system 20 even when a force of up to 2000 N act on the drive system 20 in the directions as shown by the double-arrow C in FIG. 1.

The printing machine 10 further comprises a control unit 38 which is connected by means of a programmable logic controller (PLC) 40 to the drive system 20 via the pneumoelectric converter 30, to the mechanical locking element 34 via the locking control unit 36 and to the sensor 32.

The control unit 38 comprises control elements 42 which an operator can use to interact with the control unit 38.

The control unit 38 further comprises a display 44.

The display 44 can also be a touch-sensitive display. In this case, the control elements 42 can also be omitted as the operator can use the display 44 for interaction with the control unit 38.

The control unit 38 further comprises a storage module 46 and an analysis module 48.

In the following, a method of operating the printing machine 10 will be described which can be used to ensure that ink cannot leak out from the ink reservoir 12 during printing.

Figure 3:
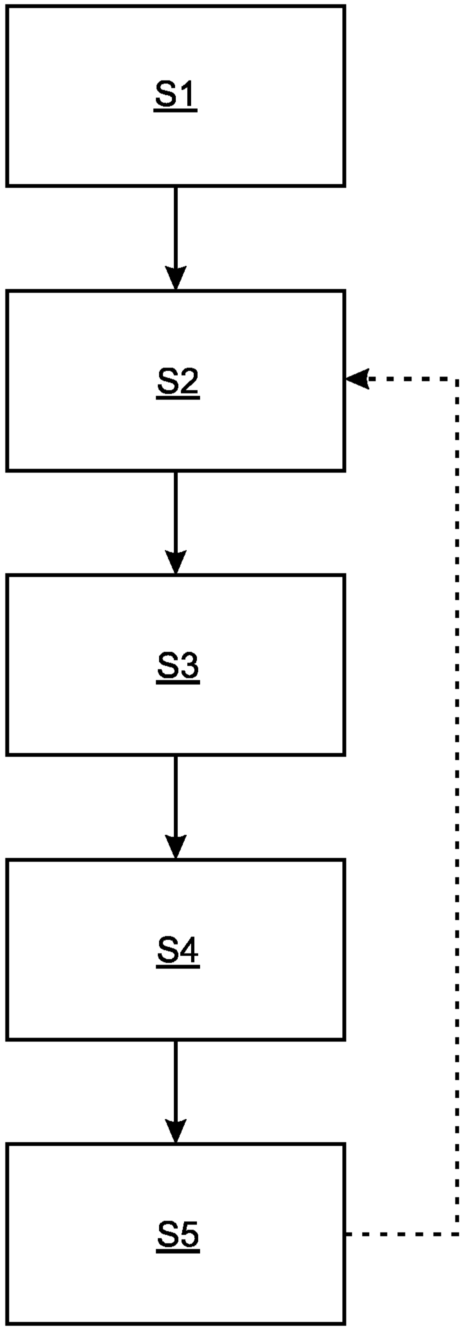
FIG. 3 shows a block scheme of a method according to the invention for operating the printing machine of FIG. 1.

First, a target force $F_{target}$ for urging the chamber doctor blade 14 against the anilox roll can be set via the control unit 38 by an operator (step S1 in FIG. 3). Alternatively, the target force $F_{target}$ can be read from the storage module 46.

Afterwards, the pneumoelectric converter 30 is activated and drives the piston 24 within the pneumatic cylinder 22, resulting in a movement of the drive system 20. Due to this movement, the chamber doctor blade 14 is pressed against the anilox roll.

The actual force F is measured by the sensor 32 and sent to the control unit 38 which stops the drive system 20 when the target force $F_{target}$ is reached, i.e. when the drive system 20 is in an operating position (step S2 in FIG. 3).

Subsequently, the drive system 20 is locked in the operating position by the mechanical locking element 34 (step S3 in FIG. 3).

If the target force $F_{target}$ cannot be reached at all, a warning is shown on the display 44 so that the operator can check whether the chamber doctor blade 14 is correctly installed and the drive system 20 is not blocked.

At this point, the printing machine 10 can start to print without the danger of ink leakage, as the chamber doctor blade 14 is in tight contact with the anilox roll and the drive system 20 is securely locked.

The actual force F is measured by the sensor 32 and the sensor value is transmitted to the control unit 38, compared with the target force $F_{target}$ and saved in the storage module 46 (step S4 in FIG. 3). If the actual force F is still equal to $F_{target}$, operation of the printing machine 10 will continue in the current state.

After a set time interval $t_1$, e.g. after 5 to 60 seconds, the actual force F is measured again by the sensor 32, transmitted to the control unit 38 and compared with the target force $F_{target}$.

This procedure of measuring the actual force F and comparing the measured actual force F with the target force $F_{target}$ is repeated every $t_1$ as long as the actual force F is equal to $F_{target}$. This mode of the printing machine 10 is called monitoring mode, i.e. the position of the drive system 20 is not actively adjusted but the actual force F is monitored by the sensor 32.

If at some point the actual force F is not any more equal to $F_{target}$, the control unit 38 shows a warning on the display 44 to inform the operator.

The control unit 38 will send a signal to the locking control unit 36 to unlock the drive system 20.

Then, the drive system 20 will again be moved in the operating position, i.e. the piston 24 will be moved such that the actual force F as measured by the sensor 32 is again equal to $F_{target}$. As soon as $F_{target}$ is reached again, the position of the drive system 20 is locked by the mechanical locking element 34, and the monitoring mode is resumed (Step S5 in FIG. 3).

During longer operation of the printing machine 10, a number of sensor values will be stored in the storage module 46. These sensor values can be used by the analysis module 48 to identify and/or classify changes in the sensor values in dependence of time and/or frequency.

Optionally, prior to the above-described method, a calibration step can be done. During calibration, the drive system 20 moves into a calibration position in which the chamber doctor blade 14 is pressed with the maximum force $F_{max}$ against the anilox roll.

If the maximum force $F_{max}$ cannot be reached at all or is not reached within an expected time interval after activation of the drive system 20, a warning is shown on the display 44.

For further ensuring correct functionality of the printing machine 10, the actual force F can be measured over a second pre-set time $t_2$ after the drive system 20 has been moved in the operating position and before locking the drive system 20. This allows to check whether the actual force F can also be sufficiently controlled just by the drive system 20 itself, even without the mechanical locking element 34.

The method according to the invention allows to reliably operate the printing machine 10 without the danger of ink leakage. By constantly monitoring the force with which the doctor blade is pushed against the anilox roll, immediate adjustment of the force is possible.

Figure 2:
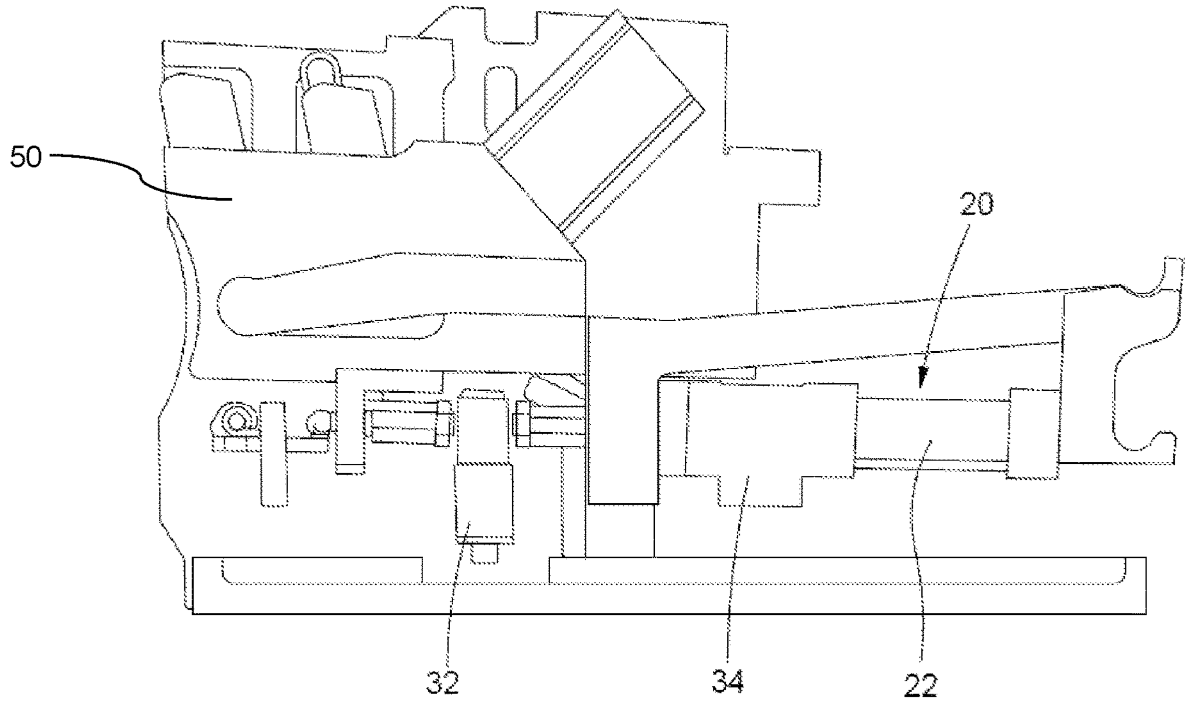
FIG. 2 shows a detail view of a printing machine according to another embodiment of the invention.

As shown a bit more in detail in FIG. 2 a sensor 32 adapted for sensing a force, is arranged between a cylinder 22 of the drive system 20 and a mounting bracket 50 of the chamber doctor blade 14, constantly monitoring the force towards the anilox roll. The cylinder 22 is mechanically looked with constant force towards the anilox roll being independent from any short term process changes like ink viscosity, air in the system or ink flow fluctuations.

As soon as the sensor 32 detects a permanent change on the force toward the anilox roll, time, frequency of change and force, are considered before a new force is set and locked.

Following an exemplary sequence is described.

cylinder pressure is set considering set up pressure and repulsive force;

unlock the cylinder 22 change pressure on the cylinder 22 e.g. via electric/pneumatic transformer, until new set up pressure is reached lock cylinder.

The invention claimed is:

1. A printing machine comprising:

a doctor blade, a drive system including a piston for urging the doctor blade in a first direction against a printing cylinder of the printing machine, a sensor adapted for sensing a force with which the doctor blade is urged against the printing cylinder when the printing cylinder is substantially static, wherein the sensor is arranged on the piston, and a mechanical locking element adapted for locking the drive system in an operating position so that when the mechanical locking element locks the drive system, the mechanical locking element restricts the drive system from moving in the first direction and a second direction opposite to the first direction.

2. The printing machine according to claim 1, wherein the drive system further comprises one or more of a first pneumatic cylinder, a hydraulic cylinder, or an electrical cylinder to move the piston.

3. The printing machine according to claim 2, wherein the mechanical locking element includes a second pneumatic cylinder to lock the piston of the drive system.

4. The printing machine according to claim 1, wherein the sensor is arranged on the piston between the mechanical locking element and the doctor blade.

5. The printing machine according to claim 1, wherein the printing machine further comprises a control unit, which is connected to the drive system, the mechanical locking element and the sensor, by a programmable logic controller.

6. The printing machine according to claim 5, wherein the control unit has a storage module for storing sensor values received from the sensor.

7. The printing machine according to claim 6, wherein the control unit comprises an analysis module configured to analyze changes in the sensor values in dependence of time and/or frequency.

8. The printing machine according to claim 1, wherein the mechanical locking element is further adapted for unlocking the drive system to allow the drive system to move the doctor blade in the first direction and the second direction relative to the printing cylinder.

9. A method of operating the printing machine according to claim 1, wherein the printing machine further includes a control unit, the method comprising:
- setting a target force for urging the doctor blade against the printing cylinder,
- moving the drive system in the operating position, wherein in the operating position, the force as measured by the sensor is the target force,
- locking the position of the drive system by the mechanical locking element,
- measuring an actual force by the sensor and comparing the actual force with the target force, and
- unlocking the position of the drive system and repeating the moving and the locking when the actual force is not equal to the target force,
- wherein the measuring is repeated at least once after a set time interval.

10. The method according to claim 9, further comprising providing a warning by the control unit of the printing machine when the measured actual force is not equal to the target force.

11. The method according to claim 9, further comprising:
- storing values of the measured actual force in a storage module of the control unit, and
- analyzing changes of the values of the measured actual force in dependence of time and/or frequency in an analyzing module of the control unit.

12. The method according to claim 9, further comprising providing a warning by the control unit when the target force cannot be reached by moving the drive system.

13. The method according to claim 9, further comprising calibrating the drive system in a calibration position, wherein in the calibration position a maximum force is measured by the sensor.

14. The method according to claim 9, further comprising measuring the force by the sensor for a second pre-set time, and
- locking the position of the drive system only when the force is constant during the second pre-set time, and
- providing a warning when the force is not constant during the second pre-set time.

15. The method according to claim 9, wherein the moving the drive system is performed by operating the piston of the drive system.

16. A printing machine comprising:
- a doctor blade;
- a drive system to move the doctor blade in a first direction toward a printing cylinder and a second direction opposite to the first direction, the second direction being a direction away from the printing cylinder, wherein the drive system includes (i) a piston to move the doctor blade and (ii) a first pneumatic cylinder to move the piston; and
- a mechanical locking element to (i) lock the drive system to restrict a movement of the drive system in the first direction and the second direction, and (ii) unlock the drive system to allow the movement of the drive system in the first direction and the second direction, wherein the mechanical locking element includes a second pneumatic cylinder.

17. The printing machine of claim 16, further comprising:
- a sensor arranged on the piston to detect a force provided by the drive system to the doctor blade against the printing cylinder.

18. The printing machine of claim 17, wherein the mechanical locking element is configured to maintain the force provided by the drive system to the doctor blade against the printing cylinder in the first direction, and prevent the doctor blade from being pushed away from the printing cylinder in the second direction.

19. A printing machine comprising:
- a doctor blade;
- a drive system including a first pneumatic cylinder;
- a mechanical locking element including a second pneumatic cylinder; and
- one or more controllers configured to:
  - control the first pneumatic cylinder of the drive system to move the doctor blade in a first direction toward a printing cylinder and a second direction opposite to the first direction, the second direction being a direction away from the printing cylinder, and
  - control the second pneumatic cylinder of the mechanical locking element to (i) lock the drive system to restrict a movement of the drive system in the first direction and the second direction, and (ii) unlock the drive system to allow the movement of the drive system in the first direction and the second direction.

20. The printing machine of claim 19, further comprising:
- a sensor to detect a force provided by the drive system to the doctor blade against the printing cylinder,
- wherein the one or more controllers are further configured to measure the force while the drive system is locked by the mechanical locking element.

* * * * *